(12) United States Patent
Ikeda et al.

(10) Patent No.: US 6,417,283 B1
(45) Date of Patent: *Jul. 9, 2002

(54) CARBON BLACK GRAFT POLYMER

(75) Inventors: Hayato Ikeda, Nara; Nobuaki Urashima, Kashiwara; Nobuyuki Ando, Tenri, all of (JP)

(73) Assignee: Nippon Shokubai Co., Ltd., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/395,328

(22) Filed: Sep. 13, 1999

(30) Foreign Application Priority Data

Sep. 14, 1998 (JP) .............................. 10-259642
Sep. 9, 1999 (JP) ........................... 11-255916

(51) Int. Cl.$^7$ ................................................. C08F 8/00
(52) U.S. Cl. ................................ 525/326.1; 525/327.3; 428/402.24; 428/407; 524/496
(58) Field of Search ................. 525/326.1, 327.3; 524/496; 428/402.24, 407

(56) References Cited

U.S. PATENT DOCUMENTS

| | | | | |
|---|---|---|---|---|
| 3,557,040 A | * | 1/1971 | Takashina et al. | 260/29.6 |
| 4,014,844 A | | 3/1977 | Vidal et al. | 260/31.2 |
| 4,880,857 A | | 11/1989 | Mori et al. | 523/205 |
| 4,940,749 A | | 7/1990 | Mori et al. | 524/547 |
| 4,994,520 A | | 2/1991 | Mori et al. | 524/547 |
| 5,380,615 A | | 1/1995 | Tokuno | 430/109 |
| 5,672,198 A | | 9/1997 | Belmont | 106/20 |
| 5,733,701 A | | 3/1998 | Anno et al. | 430/10 |
| 5,952,429 A | | 9/1999 | Ikeda et al. | 525/326 |

FOREIGN PATENT DOCUMENTS

| | | | |
|---|---|---|---|
| JP | 2-24868 | 5/1990 | C09C/1/56 |
| JP | 6-27269 | 4/1994 | C09C/1/56 |
| JP | 6-263830 | 9/1994 | C08F/292/00 |

* cited by examiner

Primary Examiner—Peter D. Mulcahy
(74) Attorney, Agent, or Firm—Fish & Richardson P.C.

(57) ABSTRACT

Carbon black graft polymer which comprises carbon black and a polymer chain grafted thereto, the carbon black having a specific surface area of not more than 120 m$^2$/g.

11 Claims, 1 Drawing Sheet

CARBON BLACK GRAFT POLYMER

BACKGROUND OF THE INVENTION

1. Field of the Invention

This invention relates to a carbon black graft polymer. More particularly, this invention relates to a carbon black graft polymer having a high carbon content and exhibiting improved dispersibility to various substances such as water, organic solvents, and organic high polymers.

This invention further relates to a static charge developing toner using the carbon black graft polymer mentioned above and other products containing the carbon black graft polymer.

2. Description of the Related Art

Since the carbon black excels in coloring property, electroconductivity, weatherability, chemical resistance etc., it is extensively utilized in various applications such as a reinforcing agent and a filler for plastics and elastomers. The carbon black, however, is rarely used by itself because it has the form of powder or grains. Generally, it is enabled to manifest the characteristic properties thereof by being uniformly dispersed in such solid basic materials as rubber or resin or in such liquid media as water or solvents. The carbon black, however, is uniformly mixed or dispersed with extreme difficulty under ordinary mixing or dispersing conditions because it has weak affinity for other substances such as, for example, organic macromolecular compounds, water, and organic solvents as compared with the cohesive force manifested between particles.

For the purpose of solving this problem, numerous studies are being pursued with a view to improving the dispersibility of hydrophilic particulates by coating the surface of the hydrophobic particulates with a varying surfactant or resin thereby causing the hydrophobic particulates to acquire exalted affinity for a medium wished to form a dispersion.

For example, (1) the carbon black graft polymer which is obtained by polymerizing a polymerizable monomer in the presence of carbon black has been attracting attention because it is enabled to have hydrophilicity and/or lipophylicity suitably varied by suitably selecting the kind of polymerizing monomer (JP-B-42-22,047, JP-B-44-3,826, JP-B-45–17,248, U.S. Pat. No. 3,557,040 etc.). Then, (2) the carbon black graft polymer obtained by the reaction of a polymer possessing such a reactive group as epoxy group or aziridine group in the molecule thereof with carbon black has been proposed (JP-B-02-24,868, JP-B-06-27,269 etc.). Further, (3) the carbon black graft polymer obtained by radically trapping in carbon black a polymer radical formed by the thermal decomposition of a polymer containing an azo bond or a peroxide bond in the molecule thereof in the presence of carbon black or the carbon black graft polymer obtained by subjecting a polymeric peroxide compound of a specific structure to partial thermal decomposition in the presence of carbon black thereby introducing a peroxide group in the carbon black and then decomposing the peroxide group on the surface of carbon black in the presence of a vinyl monomer thereby grafting a vinyl polymer to the surface of carbon black has been proposed (JP-A-06-263, 830).

Indeed, the use of these carbon black polymers exalts the dispersibility of carbon black in resin or other matrix and improves the properties of the matrix. Even in the use of such carbon black graft polymers, when the amount of carbon black incorporated in the matrix is increased, for example, to a level exceeding 10 wt. % based on the total weight of the composition incorporating the carbon black, the end product formed of this composition fails to impart sufficient dispersibility to carbon black and suffers properties thereof such as coloring property, electric resistance, dielectric property, and amount of electrification to disperse.

SUMMARY OF THE INVENTION

An object of this invention, therefore, is to provide a novel carbon black graft polymer.

An another object of this invention is to provide a carbon black graft polymer having a high carbon content and excelling in dispersibility.

Still another object of this invention is to provide a novel static charge developing toner.

Yet another object of this invention is to provide a static charge developing toner capable of producing a fixed image of satisfactorily high photographic density and high resolution at a low application rate.

The objects mentioned above are accomplished by a carbon black graft polymer comprising a carbon black and a polymer chain grafted thereto, which is characterized by that the carbon black has a specific surface area of not more than 120 $m^2/g$.

This invention also discloses the carbon black graft polymer which is characterized by being obtained by subjecting 100 parts by weight of carbon black having a specific surface area of not more than 120 $m^2/g$ and an oil absorption, regarding dibutyl phthalate, of not more than 70 ml/100 g and 5–100 parts by weight of a polymer having a reactive group exhibiting reactivity to the functional group on the surface of the carbon black to a thermal reaction.

This invention further discloses the carbon black graft polymer produced by the thermal treatment mentioned above which is carried out by melting the polymer mentioned above and kneading it with the carbon black mentioned above.

This invention further discloses the carbon black graft polymer produced by the thermal treatment mentioned above which is carried out by heating and stirring the carbon black mentioned above and the polymer mentioned above in the presence of a liquid dispersing medium.

This invention further discloses the carbon black graft polymer characterized by being obtained by heating and stirring 100 parts by weight of carbon black having a specific surface area of not more than 120 $m^2/g$ with 5–100 parts by weight of a block or graft type polymer formed of a segment (A) containing a reactive group having reactivity with the functional group on the surface of the carbon black and an anther segment (B) differing in structure from the segment (A) mentioned above in the presence of a liquid dispersing medium.

This invention further discloses a hyperdispersoid of carbon black characterized by being dispersed in a matrix selected from the group consisting of resin, rubber, and solvent a carbon black graft polymer comprising a carbon black having a specific surface area of not more than 120 $m^2/g$ and a polymer chain grafted thereto.

This invention further discloses a static charge developing toner characterized by containing a carbon black graft polymer comprising a carbon black having a specific surface area of not more than 120 $m^2/g$ and a polymer chain grafted thereto.

In the static charge developing toner according to this invention, the carbon black content mentioned above is preferred to be in the range of 12–35 wt. % based on the total weight of the toner.

The carbon black graft polymer according to this invention exhibits fine dispersibility in target media such as varying resins, rubbers, and solutions despite the relative small weight of the grafted polymer component to the weight of the carbon clack component, namely the high carbon black content thereof. The use of the carbon black graft polymer according to this invention, therefore, enables carbon black to be distributed with fine dispersibility at a high concentration in a varying composition or blend and enables the ability of the composition or blend to acquire electric resistance property, charging property, mechanical strength etc. to be adjusted as expected.

Further, the static charge developing toner according to this invention acquires fine dispersibility of carbon black even when the carbon black content thereof is increased, for example, to such a high level as exceeding 15 wt. % and excels in such toner properties as electric resistance and charging property. Since the toner is enabled to manifest the properties as required despite the increase of the carbon content thereof, the produced fixed image acquires a fully satisfactory photographic density even when the toner is used only at a low application rate. The toner permits a reduction in the consumption thereof and allows compaction of the equipment.

The above and other objects, features and advantages of the present invention will become clear from the following description of the preferred embodiments.

DESCRIPTION OF THE PREFERRED EMBODIMENTS

Now, this invention will be described in detail below with reference to the embodiments thereof.

The carbon black graft polymer according to this invention is a carbon black graft polymer obtained by grafting a polymer chain to the surface of carbon black having a specific surface area of not more than 120 $m^2/g$.

The carbon black to be used in the production of the carbon black graft polymer of this invention does not need to be particularly discriminated so long as the specific surface thereof if not more than 120 $m^2/g$, preferably not more than 100 $m^2/g$, and more preferably not more than 70 $m^2/g$. Any of varying species of carbon black such as, for example, furnace black, channel black, acetylene black, and lamp black. The furnace black is preferred over the other species mentioned above.

If the specific surface area of the carbon black exceeds 120 $m^2/g$, the produced carbon black graft polymer will fail to satisfy a high carbon black content and fully satisfactory improvement in dispersibility, workability, electric resistance etc. Although the lower limit of the specific surface area is not particularly limited, any specific surface area less than 40 $m^2/g$, especially less than 30 $m^2/$, is hardly procurable substantially.

The carbon black to be used in this invention possibly prefers the oil absorption to dibutyl phthalate (DBP absorption) to be relatively small, depending on the kind of the polymer chain intended to be grafted and the conditions of production of the carbon black graft polymer.

Specifically, when the oil absorption is relatively large, the treatment for grafting does not proceed smoothly and consequently the fully controlled production of the carbon black graft polymer having a high carbon content possibly may be not attained easily in case that the grafting is to be carried out by the treatment of melting and kneading the polymer and carbon black or in case that the polymer to be grafted has relatively low affinity for carbon black, even though the carbon black enjoys a relatively small specific surface area. When the carbon black has a relatively small specific surface area and yet a relatively large oil absorption, the produced carbon black possibly fail to acquire a fully satisfactory electric resistance.

The oil absorption of the carbon black to dibutyl phthalate (DBP oil absorption), though not particularly restricted, is desirable to be not more than 70 ml/100 g, preferably not more than 60 ml/100 g. Although the lower limit of the DBP oil absorption is also not particularly restricted, the black carbon having a DBP oil absorption of less than 20 ml/100 g, especially less than 10 ml/100 g, is practically not procurable in a form having a fully satisfactorily small particle diameter.

Further, with respect to the carbon black, it is preferable to have a functional group such as carboxyl group or hydroxy group, particularly hydroxy group, on the surface thereof. Alternatively, it is preferable that the carbon black used herein has a pH value of less than 7, particularly, a pH value in the range of 1–5. The carbon black having carboxyl group(s) can be easily procured as acidic carbon black. The carbon black which is obtained by acidifying neutral or basic carbon black can be advantageously used. If the carbon black does not have such a functional group as carboxyl group or has a pH value exceeding 7, the grafting will possibly fail to proceed effectively. The test of carbon black for pH is performed by the method specified in JIS K 6211.

Appropriately the average particle diameter of carbon black is in the range of 0.0005–0.5 $\mu$m, preferably 0.001–0.2 $\mu$m. The carbon black which has an average particle diameter of less than 0.0005 $\mu$m has only meager commercial significance because it is not easily obtained. If the carbon black has an average particle diameter exceeding 0.5 $\mu$m, it will possibly fail to impart thorough dispersibility to the produced carbon black graft polymer.

The carbon black graft polymer of this invention is obtained by grafting a polymer chain to the carbon black which has such a small specific surface area as mentioned above.

The term "carbon black graft polymer" used herein means minute particles having a polymer moiety grafted to a carbon black moiety. The carbon black graft polymer has the polymer grafted to either individual primary particles or aggregates each of several primary particles of carbon black. Then, the term "grafting" used herein means irreversible addition of a polymer to such a substrate as carbon black as defined by Jean-Baptiste Donnet et al. in "Carbon Black" of their own production (published on May 1, 1978 by Kodan-sha K.K.).

The method to be used for the production of this carbon black graft polymer does not need to be particularly discriminated but may be selected arbitrarily from the various methods heretofore known to the art. For example, a method of polymerizing a polymerizing monomer in the presence of carbon black, a method of causing a polymer having in the molecule thereof a reactive group having reactivity with the functional group present on the surface of carbon black to react with carbon black, a method of radically trapping to carbon black a polymer radical formed by thermally decomposing a polymer having in the molecule thereof a thermally decomposing radical generating group such as an azo bond or a peroxide bond in the presence of carbon black, and a method of introducing a radical generating group such as an azo group or a peroxide group into the surface of carbon black, then decomposing the radical generating group on the surface of carbon black in the presence of a polymerizing monomer, and grafting the polymerizing monomer to the surface of carbon black may be cited as concrete examples. Among other methods cited above, the method of causing the polymer having in the molecule thereof a reactive group exhibiting reactivity to the functional group present on the surface of carbon black to react with carbon black proves particularly preferable in the sense that this method is capable of grafting efficiently the charged polymer to carbon black.

Now, the method for the production of the carbon black graft polymer will be described in detail below as centered on the method of grafting a polymer having such a reactive group in the molecule thereof.

The reactive group capable of reacting with the surface of carbon black in the polymer to be grafted to carbon black is only required to be capable of reacting with the functional group which is present on the surface of carbon black and consequently contributing to the grafting of the polymer to the carbon black and is not particularly limited in any other respect. Various reactive groups are available for this purpose.

In order for the grafting to be effected more infallibly and stably, it is appropriate that the polymer moiety be capable of being bound to carbon black through the medium of a covalent bond. Particularly, the bond is expected to be one member selected from the group consisting of ester bond, thioester bond, amide bond, amino bond, ether bond, thioether bond, carbonyl bond, thiocarbonyl bond, and sulfonyl bond and preferably one member selected from the group consisting of ester bond, thioester bond, and amide bond. In consideration of this point as well, the reactive group is appropriately at least one member selected from the class consisting of epoxy group, thioepoxy group, aziridine group, and oxazoline group. The reactive group which is associated with the carbon black is not necessarily limited to those groups enumerated above. If the polymer which is used has group(s) other than the reactive group, it will possibly impose a limit on the kinds of carbon black to be effectively used. The reason why the polymer preferably is expected to have the reactive group is that the carbon black and the polymer undergo an addition reaction with very high grafting efficiency even under mild conditions without reference to the kind and the state of the carbon black allowed to be used. The carbon black which has the carboxyl group(s) as the functional group(s) on the surface thereof as described above proves particularly advantageous because this carboxyl group undergoes an irreversible thermal addition reaction with an epoxy group, a thioepoxy group, an aziridine group or an oxazoline group with a high yield and, owing to this addition reaction, and forms the covalent bond mentioned above between the carbon black moiety and the polymer moiety.

As means for introducing the reactive group(s) into the polymer, generally (1) the method which comprises polymerizing a polymerizable monomer having the reactive group in the molecular unit thereof, when necessary, in combination with another polymerizable monomer and (2) the method which comprises causing a compound having the reactive group in the molecular unit thereof to react with a polymer capable of reacting with the compound thereby effecting introduction of the reactive group(s) into the polymer which are both disclosed in WO88/03545 (PCT/JP 87/00867) are available.

Incidentally, the pertinent passage disclosed in WO88/03545 (PCT/JP 87/00867) mentioned above is incorporated in herein by reason of its association herewith.

As skeleton structure of the polymer with the reactive group which can react with the functional group in the surface of carbon black, by putting thing in which carbon black graft polymer of this invention is produced, it is not particularly limited. For example, it is possible to use various types of vinyl polymer structures, polyether structures and polyester structures, etc. However, those which manifest high affinity or compatibility for the matrix, such as resin, in which the produced carbon black graft polyer are intended to be dispersed, are preferable.

As concrete examples of the polymerizable monomer (a) which is usable in the above mentioned method (1) and containing in the molecular unit thereof a reactive group for carbon black, epoxy group-containing polymerizable monomers represented by the following formulas:

(wherein each R¹ is a hydrogen atom or a methyl group independently and each n is 0 or an integer from 1 to 20 independently);

thioepoxy group-containing polymerizable monomers represented by the following formulas:

(wherein R¹'s and n's are as defined above in the formulas of the epoxy group-containing polymerizable monomers);

aziridine group-containing polymerizable monomers represented by the following formulas:

oxazoline group-containing polymerizable monomers such as 2-vinyl-2-oxazoline, 2-vinyl-4-methyl-2-oxazoline, 2-vinyl-5-methyl-2-oxazoline, 2-vinyl-4-ethyl-2-oxazoline, 2-vinyl-5-ethyl-2-oxazoline, 2-isopropenyl-2-oxazoline, 2-isopropenyl-4-methyl-2-oxazoline, 2-isopropenyl-5-methyl-2-oxazoline, 2-isopropenyl-4-ethyl-4-oxazoline, 2-isopropenyl-5-ethyl-2-oxazoline, and 2-isopropenyl-4,5-dimethyl-2-oxazoline; and N-hydroxyalkylamide group-containing polymerizable monomers such as N-hydroxymethyl acrylamide, N-hydroxyethyl acrylamide, N-hydroxybutyl acrylamide, N-hydroxyisobutyl acrylamide, N-hydroxy-2-ethylhexyl acrylamide, N-hydroxycyclohexyl acrylamide, N-hydroxymethyl methacrylamide, N-hydroxyethyl methacrylamide, N-hydroxybutyl methacrylamide, N-hydroxyisobutyl methacrylamide, N-hydroxy-2-ethylhexyl methacrylamide, and N-hydroxycyclohexyl methacrylamide may be cited. These polymerizable monomers may be used either singly or in the form of a mixture of two or more members.

The polymerizable monomer (b) which can be used with the polymerizable monomer having the reactive group when needed, is only required to be capable of copolymerizing with the monomer (a) mentioned above and is not particularly limited in any other respect. As concrete examples of the polymerizable monomer (b), styrene type monomers such as styrene, o-methyl styrene, m-methyl styrene, p-methyl styrene, a-methyl styrene, p-methoxy styrene, p-tert-butyl styrene, p-phenyl styrene, o-chlorostyrene, m-chlorostyrene, and p-chlorostyrene; acrylic acid or methacrylic acid type monomers such as acrylic acid, methyl acrylate, ethyl acrylate, propyl acrylate, n-butyl acrylate, isobutyl acrylate, dodecyl acrylate, stearyl acrylate, 2-ethylhexyl acrylate, methacrylic acid, methyl methacrylate, ethyl methacrylate, propyl methacrylate, n-butyl methacrylate, isobutyl methacrylate, n-octyl methacrylate, dodecyl methacrylate, 2-ethylhexyl methacrylate, and stearyl methacrylate; and etylene, propylene, butylene, vinyl chloride, vinyl acetate, acrylonitrile, acrylamide, methacrylamide, and N-vinyl pyrrolidone may be cited. From the group of polymerizable monomers cited above, one member or a combination of two or more members may be selected and put to use.

As concrete examples of the compound (c) which is used in the method (2) mentioned above and which has the reactive group, (i) compounds containing in the molecular unit thereof two or more pieces of one species of the reactive groups, (ii) compounds containing in the molecular unit thereof two or more species of the reactive groups, and (iii) compounds containing in the molecular unit thereof at least one species of the reactive groups and a functional group (or groups) other than the reactive groups mentioned above may be cited.

As concrete examples of the polymer (d) in the method (2), polymers such as vinyl type polymers, polyesters, and polyethers which have a group capable of reacting with the compound having the reactive group as mentioned above are cited. As concrete examples of the group which is capable of reacting with the compound, hydroxyl group (including phenolic hydroxyl group), carboxyl group, quinone group, amino group, and epoxy group may be cited. The polymer which has this group can be easily obtained by such known methods of polymerization as radical polymerization or polycondensation. According to the method (2), the reactive polymer having the reactive group can be obtained by causing the compound (c) to react with the polymer (d) under selected conditions such that at least one of the reactive groups may remain unaltered.

The molecular weight of the reactive polymer to be used in this invention is not particularly limited. Nevertheless, when considering the grafting effects to the carbon black and the workability on the reaction with the carbon black, it is desirable to have the number average molecular weight in the approximate range of 1000–1000000, preferably 5000–100000.

Further, the number of reactive groups which the reactive polymer has per molecule is not particularly limited. But, it may be desirable in the approximate range of 1–50, preferably 1–20, on the average per molecule.

Further, in a preferred embodiment of producing the carbon black graft polymer according to this invention, the polymer to be used is a block or graft type polymer formed of a segment (A) containing a reactive group having reactivity with the functional group on the surface of the carbon black and an anther segment (B) differing in structure from the segment (A) mentioned above. Particularly, a block or graft type polymer formed of the segment (A) and the segment (B), wherein the segment (B) exhibits higher affinity for the target medium such as solution or resin to which the finally obtained carbon black graft polymer would be added and the segment (A) exhibits lower affinity for the target medium than the segment (B) and only the segment (A) has the reactive group capable of reacting with the functional group on the surface of said carbon black, is used.

The polymer having reactivity with carbon black and used heretofore in the production of the carbon black graft polymer is either a random copolymer or a polymer having one reactive group at one terminal thereof and the reactive group capable of reacting with carbon black as distributed sparsely or substantially singly in one molecular chain. In contrast, the block- or graft-copolymer is in such a form that the groups reactive with carbon black are concentrated in a specific site, namely the segment (A), and therefore is thought to heighten greatly the probability of reaction with carbon black.

When the carbon black has the prescribed small specific surface area, but has the DBP oil absorption exceeding 70 ml/100 g is considered, to use the random copolymer or polymer having one reactive group at one terminal thereof would result in, with a certain high frequency, that the carbon black graft polymer of high carbon content is not produced in the good controllability.

Since the grafting process does not progress skillfully unless the mashing quantity of the polymer which it intends to graft is increased. However, as far as the block- or graft-type reactive polymer are used and the carbon black satisfies the regulation for the specific surface area, the grafting process progresses well, even if the carbon black has so large DBP oil absorption. Of course, it is possible to produce carbon black graft polymer in which the carbon content is naturally high in the good controllability when using as a carbon black that which the DBP oil absorption is not more than 70 ml/100 g.

Further, the improvement of the grafting efficiency is considered to be made more conspicuous by designing the molecular formulation of the polymer destined to form the polymer moiety so that a segment (B) having high affinity for the medium selected as a target and a segment (A) having lower affinity for the medium than the segment (B) make up the polymer and the segment (A) alone has a reactive group capable of reacting with the functional group on the surface of carbon black and contributing to the grafting, and then implementing the grafting in a liquid dispersion medium formed of either the target medium mentioned above or a medium having characteristic (such as the polarity) resembling those of the target medium.

Figure 1:
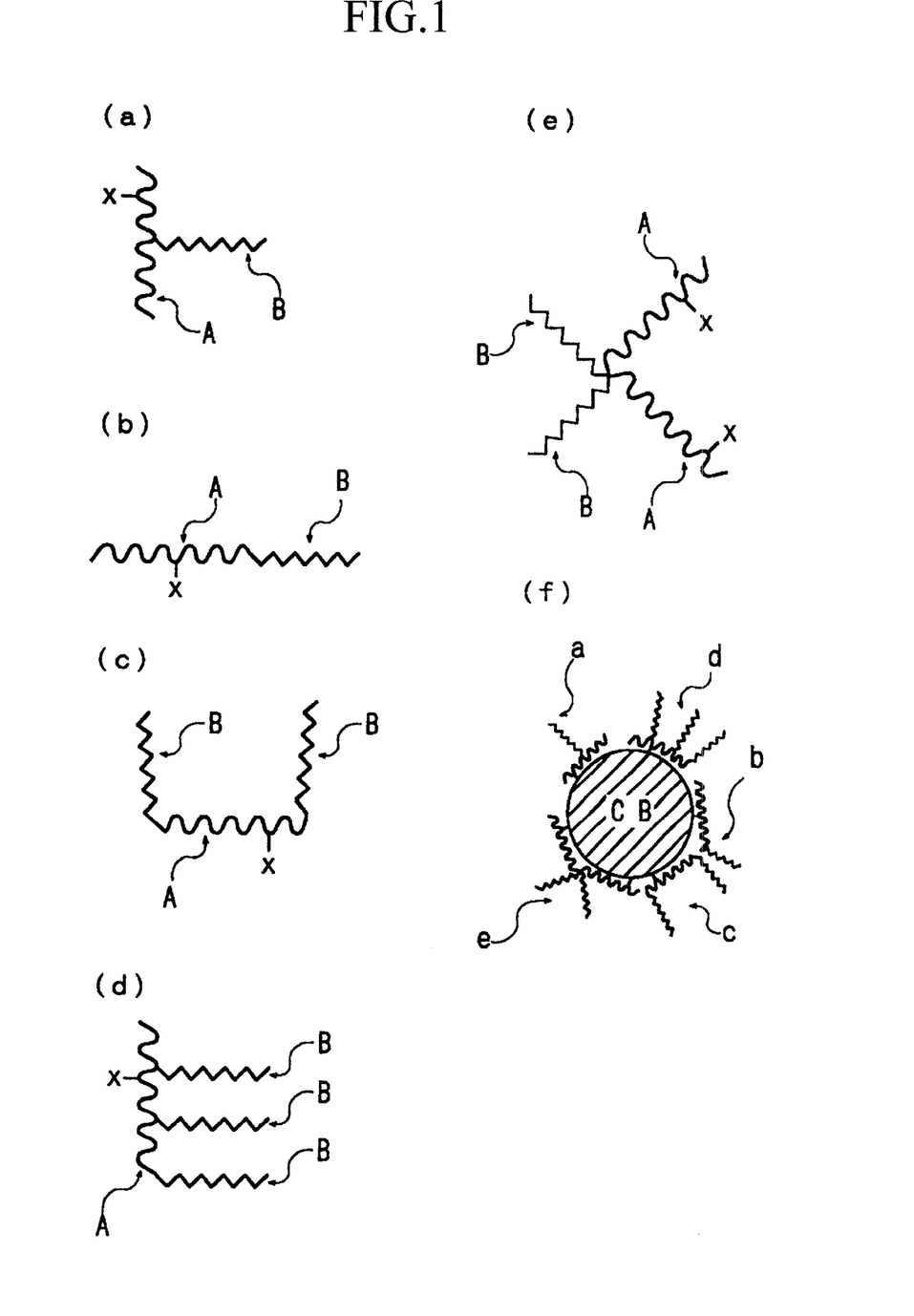
FIGS. 1(a)–(e) are diagrams illustrating schematically examples of the structure of the block- or graft-copolymer to be used in one embodiment of the carbon black graft polymer according to this invention and FIG. 1(f) is a diagram illustrating schematically the state of linkage of block- or graft-copolymers to the surface of a carbon black particle (CB).

The graft chain bound to the surface of the carbon black graft polymer which is consequently obtained manifests high affinity for the medium selected as a target because it is so oriented that the segment (B) having high affinity for the medium may be exposed to the outer side. Thus, the carbon black graft polymer can be dispersed on the order of submicrons in the medium. The block- or graft-copolymer is not limited to the simple structure of an A-B type block copolymer as shown in FIG. 1(a) and an A-B type graft copolymer as shown in FIG. 1(b) but may be selected from various polymers such as, for example, a B-A-B type block copolymers as shown in FIG. 1(c) or higher alternate block copolymers, comb-shaped graft copolymers having a plurality of segments B grafted to a segment A as shown in FIG. 1(d), and pentacle graft copolymers as shown in FIG. 1(e). In the diagrams mentioned above, the symbol X represents a reactive group. FIG. 1(f) represents the state in which various block- or graft-polymers are bound to the surface of a carbon black particle (CB). The essential thing is that the block- or graft-copolymer may be in any of known forms on the condition that at least one segment (B) can be oriented with freedom of certain degree toward the outside from the surface of the carbon black particle as the copolymer was bound to the surface of the carbon black particle Otherwise, the polymer may be in a form such that several kinds of segments falling under the category of segment (A)) are existed as segments (A) (similarly, regarding the category of segment (B), several kinds of segments may be existed).

The segment (A) containing the reactive group appropriately manifests low affinity for the medium selected as a target on account of the structure of the segment chain. The expression "low affinity" is used strictly herein relative to the affinity of the other segment (B). Depending on the kind of the target medium or the structure of the segment (B), therefore, the structure of the segment (A) cannot be generally specified but may be any of the various known structures. From another point of view, the fact that the segment (A) manifests high affinity for carbon black proves advantageous because the ability thereof to orient relative to the carbon black improves proportionately to the affinity. However, when the segment (A) containing the reactive group is adapted to manifest notably lower affinity for the target medium on the chain structure thereof than the segment (B), it is not necessarily required to manifest high affinity for carbon black. The segment (A) is satisfactorily usable even when the affinity thereof is substantially equal to or even lower than that of the segment (B) for carbon black.

The chain structure of the segment (A), as described above, can be suitably selected depending on the chain structure of the segment (B) which is selected with a view to the dispersibility intended to be imparted to carbon black. For example, it may be a polymer chain (containing the reactive group mentioned above) which is selected from the group of the various vinyl type polymers which are obtained by the homopolymerization or copolymerization of styrenic monomers, (meth)acrylic monomers, and alkylene type monomers, and polyesters and polyethers. Among other concrete examples of the segment (A) enumerated above, the segment (A) is preferably a vinyl type polymer, particularly a vinyl type polymer which contains not less than 50 mol %, preferably not less than 60 mol %, of a vinyl type monomer component having an aromatic ring and has a reactive group as well because it can be combined with a varying kind of segment (B) which is selected to suit the target medium.

In consideration of such factors as economy, a homopolymer or copolymer formed principally of a styrene type monomer and a (meth) acryl type monomer, particularly a polymer chain containing not less than 50 mol %, preferably not less than 60 mol %, of a styrene type monomer component (having the reactive group mentioned above) proves particularly advantageous.

On the other hand, the segment (B) should have a high affinity for the target medium, and may be suitably selected from among polymer chains having polystyrene type structure, poly(meth)acryl type structures, polyether type structures such as polyalkylene glycol, polyester type structures, polysiloxane type structures, polyalkylene type structures, polyamide structures, polyimide structures, and polyurethane structures.

Further, when the carbon black graft polymer of this invention is intended for using in the static charge image developing toner, such polymer structures as polystyrene type structures, poly(meth)acryl type structures, and styrene (meth)acryl type copolymer structures, are desirable. Particularly, polystyrene, polybutyl acrylate, polybutyl methacrylate, and polystearyl acrylate are desirable. Further, even in a case in which the segment (A) and the segment (B) are comparatively similar to each other with respect to their skeleton structures, that is to say, they have skeleton structures which originate from the same monomer component, it is possible to orientate segment (A) toward the carbon black side, and to react efficiently the reactive group existing in the segment (A) with the carbon black on the grafting reaction. That is to say, other structural unit is inevitably included in segment (A), for introducing the reactive group capable of reacting with the functional group of carbon black, even if the segment (A) has the monomer component as identical with segment (B). Therefore, if the quantity of this structural unit exists to some extent, the significant differences between segment (A) and segment (B) can be produced with respect to the affinity to carbon black and that to binding resin, etc., The method for producing the block- or graft-copolymer having the segment (A) containing the reactive group and the segment (B) differing in skeletal structure from the segment (A) and preferably manifesting higher affinity for the target medium than the segment (A) is not particularly limited. The production can be effected by properly combining the technique for the production of a reactive polymer with the technique for the polymerization of a varying block- or graft-type polymer.

As a means for obtaining a graft-type polymer, the method which comprises subjecting a polymerizable monomer together with a polymerization initiator to solution polymerization, emulsion polymerization, bulk polymerization, or suspension polymerization in the presence of a macromolecular compound destined to form a graft chain thereby forming a polymer intended as a main chain has been known. This method, however, is defective in respect that when the macromolecular compound mentioned above contains no radically polymerizable functional group, the produced graft-copolymer entrains an ungrafted polymer in a large amount and consequently the efficiency of grafting is unduly low. Therefore, it is preferable that the method is done with using a radically polymerizable macromolecular compound as the macromolecular compound. However, when the segment (B) in the polymer chain contained in the produced carbon black graft polymer either coincides with or manifests high affinity for the binder resin or solvent which is destined to constitute the matrix of the composition in which the carbon black graft polymer is dispersed, even the graft polymer obtained by the method with a rather low grafting efficiency can be expected to enjoy highly effective exaltation of the stability of dispersion. The above mentioned radically polymerizable macromolecular compound, generally designated as "macromonomer," has a radically polymerizable group such as, for example, a (meth) acryloyl group or styryl group at one terminal thereof. It is obtained, for example, by causing a polymer containing a carboxyl group at one terminal thereof to react with a radically polymerizable monomer containing a glycidyl group in an organic solvent (JP-B-43-11224, for example, discloses a method which obtains this macromonomer by causing a prepolymer obtained by radically polymerizing a radically polymerizable monomer in an organic solvent in the presence of mercapto acetic acid to react with glycidyl methacrylate in the presence of a dimethyl lauryl amine catalyst).

For the purpose of obtaining the graft-copolymer according to this invention, therefore, it suffices to polymerize a polymerizable monomer (f) containing in the molecular unit thereof such a reactive group for carbon black as mentioned above and a polymerizable monomer (g) which is incorporated as occasion demands and destined to form the skeleton of the segment (A) in the presence of a radically polymerizable macromolecular compound (e) as a component for forming the segment (B).

As polymerizable monomer (f) which has the reactive group for the carbon black in the intramolecule, the compounds equal to those disclosed with relation to the polymerizable monomer (a) can be exemplified. As polymerizable monomer (g) which can be used by the necessity in order to make the segment (A) into the desired skeleton, there is no limitation as far as it can be copolymerized with the monomer (f) and aforementioned monomer (e) which is an ingredient of segment (B). Thus, as the monomer (g) various types monomer would be able to be used in accordance with the molecular structure of the segment (A) to be formed. For example, the compounds equal to those disclosed with relation to the polymerizable monomer (c) can be used as single or two or more in combination.

The radically polymerizable macromolecular compound (e) to be used for forming the segment (B) component is only required to have a reactive group at one terminal of a proper polymer chain, which is selected from among the polymer chains such as of polysiloxane type structures, poly(meth)acryl type structures, polyether type structures like polyalkylene glycol, polyester type structures, polyalkylene type structures, polyamide structures, polyimide structures, and polyurethane structures.

When the segment (B) is required to have a polysiloxane type structure, for example, the polysiloxane type structure may contain any of such polyorganosiloxanes as polydimethyl siloxane group, partially alkyl group-substituted polydimethyl siloxane group, partially aryl group-substituted polydimethyl siloxane group, and tris(trialkylsiloxy)silyl propyl group.

The radically polymerizable macromolecular compounds ($e_1$) having these polysiloxane type structures include polymerizable polysiloxanes such as, for example, (meth) acryloyl group-containing polydimethyl siloxane, styryl group-containing polydimethyl siloxane, (meth)acryloyl group-containing partially octyl-substituted polydimethyl siloxane, styryl group-containing partially octyl-substituted polydimethyl siloxane, styryl group-containing partially phenyl-substituted polydimethyl siloxane, and tris (trimethylsiloxy) silyl propyl (meth)acrylate. These macromolecular compounds may be used either singly or in the form of a combination of two or more members. Among other macromolecular compounds enumerated above, the compounds of the following formula prove particularly advantageous:

(wherein B is —COO— or a phenylene group, $R^1$ is a hydrogen atom or a methyl group, $R^2$ is an alkylene group of 1–6 carbon atoms, $R3$–$R^{13}$ are identical or different and each is an aryl group, an alkyl group of 1–6 carbon atoms, or an alkoxyl group of 1–10 carbon atoms, a and b are identical or different and each is an integer of 0–10, and n is an integer of 0–200).

Similarly, where the segment (B) is required to have a polymeth(acryl) type structure, the radically polymerizable macromolecular compounds ($e_2$) which are usable herein include the compounds represented by the following formulas:

(wherein $R^1$ and $R^2$ are identical or different and each is a hydrogen atom or a methyl group, $R^3$ is an alkyl group of 1–25 carbon atoms, X is an arbitrary coupling chain, Y is the terminal of an initiating agent or a hydrogen atom, and n is an integer of 0–500);

(wherein $R^1$, $R^2$, and $R^4$ are identical or different and each is a hydrogen atom or a methyl group, $R^3$ and $R^5$ are identical or different and each is an alkyl group of 1–25 carbon atoms, X is an arbitrary coupling chain, Y is the terminal of an initiating agent or a hydrogen atom, and m and n are identical or different and each is an integer of 0–500); and (wherein $R^1$ and $R^2$ are identical or different and each is a hydrogen atom or a methyl group, $R_3$ is an alkylene group of 1–25 carbon atoms, $R^4$ is an alkyl group of 1–25 carbon atoms, X is an arbitrary coupling chain, Y is the terminal of an initiating agent or a hydrogen atom, and n and m are identical or different and each is an integer of 0–500).

Then, where the segment (B) is required to have a polyalkylene glycol type structure, the radically polymerizable macromolecular compounds ($e_3$) which are usable herein include the compounds represented by the following formulas:

(wherein $R^1$, $R^2$, and $R^3$ are identical or different and each is a hydrogen atom or a methyl group and n is an integer of 0–500); and (wherein $R^1$, $R^2$, $R^3$, and $R^4$ are identical or different and each is a hydrogen atom or a methyl group and n and m are identical or different and each is an integer of 0–500).

Further, where the segment (B) is required to have a polystyrene type structure, the radically polymerizable macromolecular compounds ($e_4$) which are usable herein include the compounds represented by the following formula:

(wherein $R_1$ is a hydrogen atom or a methyl group, X is an arbitrary coupling chain, Y is the terminal of an initiating agent or a hydrogen atom, a halogen-substituted group, or an alkyl group of 1–8 carbon atoms, and n is an integer of 0–500).

The "coupling chain X" appearing in the group of formulas shown above is explained in detail in the "Chemistry and Industry of Macromonomers" (compiled under supervision of Yuya Yamashita and published by IPC K.K. on Sep. 20, 1988). All of the concrete examples shown in the publication are invariably usable herein.

The method to be used for obtaining the graft type precursor polymer may be any of the known methods of polymerization. For example, the methods of bulk polymerization, suspension polymerization, emulsion polymerization, and solution polymerization may be cited. Among other methods of polymerization mentioned above, the method of solution polymerization by the use of a radical catalyst proves particularly advantageous.

The radical catalyst may be any of the various radical catalysts which are generally used for the polymerization of vinyl monomers. As typical examples of the radical catalysts, azo type compounds such as 2,2'-azobis-isobutyronitrile and 2,2'-azobis(2,4-dimethyl valeronitrile) and peroxide type compounds such as benzolyl peroxide, di-tert-butyl peroxide, tert-butyl peroctoate, and tert-butyl peroxy-2-ethylhexanoate may be cited. The radical catalyst is generally used in an amount in the range of 0.2–10 parts by weight, preferably 0.5–5 parts by weight, based on 100 parts by weight of the monomer. The solvent for the polymerization is suitably selected, depending on the kind of monomer and the kind of radical polymerizable macromolecular compound to be used.

As another means which can be used for obtaining the graft-copolymer, the method which comprises causing a compound (h) containing a reactive group for carbon black to react with a precursory polymer containing in a segment (A) a group capable of reacting with the compound (h) and having a segment (B) grafted to the segment (A), thereby introducing the reactive group into the precursory polymer may be cited.

As concrete examples of the compound (h) mentioned above, compounds containing in the molecular unit thereof two or more pieces of one species of the reactive groups for carbon black mentioned above, compounds containing in the molecular unit thereof two or more species of the reactive groups for carbon black mentioned above, and compounds containing in the molecular unit thereof at least one species of the reactive groups for carbon black and a functional group (or groups) other than the reactive groups mentioned above may be cited.

Incidentally, the "functional group" just mentioned refers to groups other than epoxy group, thioepoxy group, aziridine group, and oxazoline group and oxazoline group, and capable of reacting with the above mentioned group which is qualified as "capable of reacting with the compound" and had by the segment (A) of the precursory polymer. As concrete examples of the group "capable of reacting with the compound" and had by the precursory polymer, isocyanate group, amino group, carboxyl group, hydroxyl group, and vinyl group may be cited.

As means for obtaining the block polymer, the anion living polymerization method, the cation living polymerization method, the iniferter method, etc. have been known. As another means, the method which comprises radically polymerizing the monomer of the segment (A) or the segment (B) (this invention prefers the segment (B) to the segment (A) because the segment (A) introduces the reactive group) in the presence of a compound such as 2-acetyl thioethyl thiol or 10-acetyl thiodecane thiol which contains a thioester and a thiol group in the molecular unit thereof, treating the produced polymer with an alkali such as sodium hydroxide or ammonia, thereby forming a polymer containing a thiol group at one terminal thereof, and radically polymerizing the monomer of the other segment in the presence of the thiol group terminal polymer is known.

For the purpose of obtaining the block copolymer according to this invention, it suffices to alter suitably the known method mentioned above, namely to use as the polymerizable monomer of the segment (A) a polymerizable monomer (f) containing the reactive group mentioned above in at least part thereof and introduce the reactive group into the segment (A) during the polymerization of the block copolymer or introduce the reactive group into the segment (A) after the polymerization of the block copolymer in the same manner as in the production of the graft copolymer mentioned above.

To cite an example for the sake of comprehension, the synthesis by the anion living method is carried out by adding styrene in a stream of nitrogen into tetrahydrofuran with the aid of 4-vinyl benzyl lithium, polymerizing the monomer, then polymerizing methyl methacrylate at a low temperature thereby obtaining an A-B block (styrene-methyl methacrylate) copolymer, and thereafter converting the vinyl group at the initiating terminal of the segment (A) into an epoxide group by the use of 3-chloro-perbenzoic acid thereby introducing the reactive group capable of reacting with carbon black into the segment (A). Another method may be adopted which comprises adding styrene in a stream of nitrogen into tetrahydrofuran with the aid of 4-vinyl benzyl lithium, polymerizing the monomer thereby obtaining the segment (A), then adding glycidyl methacrylate to the reaction system thereby coupling a segment having the reactive group with the segment (A), and thereafter polymerizing methyl methacrylate at a low temperature.

The molecular weight of the graft- or block-copolymer obtained as described above is not particularly limited. In consideration of the effect of grafting to carbon black and the workability of the polymer during the reaction thereof with carbon black, the polymer appropriately has an average molecular weight in the range of 1000–1000000, preferably in the range of 5000–100000.

The molecular weights of the segment (A) and the segment (B) in the graft- or block-copolymer are not particularly limited but are affected by the kinds of polymer chains forming these segments. From the standpoint of the efficiency of grafting to carbon black, the segment (A) appropriately has an average molecular weight in the range of 300–100000, preferably in the range of 5000–50000. From the standpoint of effecting the impartation of improved dispersibility to carbon black, the segment (B) appropriately has an average molecular weight in the range of 500–100000, preferably in the range of 1000–50000. Though the number of reactive groups had by the graft- or block-copolymer is not particularly limited, it appropriately falls in the approximate range of 50–1, preferably 20–1, on the average per molecule of the polymer.

Now, the method for grafting such a polymer as described above to the specific carbon black described above will be explained with reference to typical preferred embodiments.

In the first embodiment, the carbon black graft polymer can be obtained by heating and mixing a carbon black having a specific surface area of not more than 120 $m^2/g$ and a DBP oil absorption of not more than 70 ml/100 g and a polymer having a reactive group capable of reacting with the functional group on the surface of the carbon black in the presence or absence of a suitable liquid dispersing medium.

The carbon black graft polymer obtained by grafting a polymer chain to carbon black having a specific surface area of not more than 120 m²/g and a DBP oil absorption of not more than 70 ml/100 g is characterized firstly by the fact that the amount of the polymer portion formed of the polymer chain is relatively small, namely the carbon black graft polymer has a high carbon black content. This high carbon black content may be logically explained by supposing that the sites of bondage of the grafted polymer are restricted by the use of carbon black having a relatively small specific surface area.

The ratio of the amount of carbon black to the amount of the grafted polymer in the carbon black graft polymer typically is such that the amount of the grafted polymer may fall in the approximate range of 0.1–10, preferably 0.5–8, based on the weight of the carbon black taken as 10, though it does not need to be particularly restricted.

Incidentally, this ratio has been calculated from the results of an experiment conducted by subjecting the reaction solution obtained at the completion of the reaction of grafting to centrifugal separation, separating a black substance (carbon black and a polymer component bonded thereto) precipitating from the supernatant liquid formed of the unaltered polymer and the dispersing medium, drying the black substance at room temperature to obtain a sample, and testing this sample for weight loss with the aid of a thermal balance. By utilizing the fact that the resin is thermally decomposed even in nitrogen and the carbon is not decomposed in nitrogen, the weight loss is determined by first heating the sample in nitrogen for a prescribed duration thereby decomposing the resin component, then switching the atmosphere from nitrogen to oxygen (air), heating the sample to a higher temperature thereby burning the carbon black, and meanwhile measuring relevant weight losses under pertinent conditions.

The carbon black graft polymer according to this invention is surprisingly improved fully satisfactorily in such properties of carbon black as dispersibility, electric resistance, and mechanical strength in spite of the small amount of the grafted polymer portion, though the reason therefor remains yet to be elucidated in detail.

When this carbon black graft polymer is incorporated in a varying composition such as resin, rubber, or solvent, therefore, the carbon black content in the composition can be heightened fully satisfactorily and, in spite of the high carbon black content in the composition, the composition exhibits fine dispersibility of carbon black and excels in such properties as electric resistance, charging property, and mechanical strength.

This grafting is effected, for example, by stirring and mixing the polymer and the carbon black at a temperature in the range of 50–150° C., preferably 70–140° C., for a period in the range of 0.5–10 hours, preferably 1–5 hours. If the reaction temperature is less than 50° C., the grafting will possible fail to proceed.

As the reaction apparatus, a stirring tank which is adopted for ordinary stirring or a mixing device such as, for example, a ball mill, a mixer, or a kneader which is adopted for mixing can be used. It is particularly advantageous to use for this treatment an apparatus for wet dispersion which comprises a vessel for holding therein a liquid to be treated, a stirrer adapted to rotate in the vessel, a heating device for heating the liquid held in the vessel, and a plurality of granular media held inside the vessel.

Numerous wet dispersing devices and wet pulverizing devices for producing a stirring or disintegrating action by combined use of a stirrer and such granular media as beads are known in the art. This invention uses an apparatus that combines a device of this kind with a heating device for heating the liquid being treated. The use of the apparatus of this structure permits a carbon black graft polymer having an amply minute particle diameter (having the polymer grafted to carbon black which has been satisfactorily disintegrated from a secondarily agglomerated state) to be produced with extremely high efficiency.

The ratio of the carbon black to the polymer mentioned above in this grafting cannot be generally specified because it is varied by the kind of the polymer to be used and the use for which the product aimed at is applied. Properly, it is 100 parts by weight of carbon black to 5–100 parts by weight, preferably 10–80 parts by weight, of the polymer. If the amount of the polymer is less than 5 part by weight, it will be possibly difficult to improve thoroughly the surface properties of the carbon black.

Conversely, if the amount exceeds 100 parts by weight, the amount of the polymer to be bonded to the carbon black does not increase beyond a fixed level and only the amount of the polymer escaping reaction with the carbon black increases in the reaction system. Thus, the excess brings the advantage that this excess impairs economy and the removal thereof entails difficulty and deteriorates the properties of the produced graft carbon black.

The liquid dispersion medium which can be used in the embodiment of using that as the grafting reaction, this grafting depends on the structure of the segment (A) of the relevant polymer. As concrete examples of the liquid dispersion medium effectively usable in the embodiment of using it on the grafting reaction, water; alcohols such as methyl alcohol, ethyl alcohol, isopropyl alcohol, and butyl alcohol; hydrocarbons such as liquid paraffin, decane, decene, methyl naphthalene, decalin, kerosine, diphenyl methane, toluene, dimethyl benzene, ethyl benzene, diethyl benzene, propyl benzene, cyclohexane, and partially hydrogenated triphenyl; silicone oils such as polydimethyl siloxane, partially octyl-substituted polydimethyl siloxane, partially phenyl-substituted polydimethyl siloxane, and fluorosilicone oil; halogenated hydrocarbons such as chlorobenzene, dichlorobenzene, bromobenzene, chlorobiphenyl, and chlorodiphenyl methane; fluorides such as Daifloil (produced by Daikin Kogyo Co., Ltd.) and Demnum (produced by Daikin Kogyo Co., Ltd.); and esters such as ethyl benzoate, octyl benzoate, dioctyl phthalate, trioctyl trimellitate, dibutyl sebacate, ethyl (meth)acrylate, butyl (meth)acrylate, and dodecyl (meth)acrylate may be cited, but not limited thereto.

In the second embodiment, the carbon black graft polymer can be obtained by heating and stirring 100 parts by weight of carbon black having a specific surface area of not more than 120 m²/g and 5–100 parts of a block- or graft-copolymer formed of a segment (A) containing a reactive group having reactivity with the functional group on the surface of the carbon black and another segment (B) differing in structure from the segment (A) mentioned above in the presence of a liquid dispersing medium.

The carbon black graft polymer obtained by grafting a block- or graft-copolymer chain to the carbon black having a specific surface area of not more than 120 m²/g, similarly to the carbon black graft polymer obtained by the method of the first embodiment described above, has the polymer portion formed of the polymer chain in a relatively small amount, namely, a high carbon black content therein. The ratio of the amount of carbon black to the amount of the grafted polymer in the carbon black graft polymer typically is such that the amount of the grafted polymer may fall in the approximate range of 0.1–10, preferably 0.5–8, based on the weight of the carbon black taken as 10, though it does not need to be particularly restricted. This ratio has been determined in the same manner as described above.

This carbon black graft polymer is fully satisfactorily improved in such properties of carbon black as dispersibility, electric resistance, and mechanical strength in spite of the small amount of the grafted polymer portion as described above.

When this carbon black graft polymer is incorporated in a varying composition such as resin or rubber, the produced composition is enabled to acquire a fully satisfactory high carbon black content without requiring the amount of the carbon black graft polymer incorporated therein to be markedly increased. Moreover, the composition exhibits fine dispersibility of carbon black and excels such properties as electric resistance, charging property, and mechanical strength even when the carbon black content is heightened as described above.

With respect to the grafting of the above mentioned graft- or block-copolymer with the carbon black, it would be preferable to perform it under the presence of either a target medium or a liquid dispersion medium having characteristic resembling those of the target medium, wherein the target medium being to be used for dispersing the ultimately obtained carbon black graft polymer. The target medium or liquid dispersion medium manifests high affinity or compatibility for the segment (B) of the polymer and low affinity or compatibility for the segment (A).

The dispersion medium to be used, therefore, is suitably selected, depending on the combination of the segment (A) and the segment (B) in the polymer.

When the segment (A) has a polystyrene type structure and the segment (B) has a hydrophobic (meth)acryl type structure such as polymethyl methacrylate in the polymer, for example, the liquid dispersion media which are advantageously used herein include cellosolves such as methyl cellosolve and ethyl cellosolve; esters such as methyl acetate, ethyl acetate, and butyl acetate; ketones such as acetone, methylethyl ketone, and methylisobutyl ketone; and nonprotonic polar solvents such as pyrrolidone, N,N-dimethyl formamide, and dimethyl sulfoxide, for example.

When the segment (A) has a polystyrene type structure and the segment (B) has a polyalkylene glycol type structure in the polymer, for example, the liquid dispersion media which are advantageously used herein include water, water-alcohol mixture, alcohols such as methyl alcohol and ethyl alcohol; glycols such as ethylene glycol and diethylene glycol; and polyhydric alcohols such as glycerin, for example.

As is the case with the first embodiment mentioned above, this grafting is effected, for example, by stirring and mixing the polymer and the carbon black at a temperature in the range of 50–150° C., preferably 70–250° C., for a period in the range of 0.5–10 hours, preferably 1–5 hours. If the reaction temperature is less than 50° C., the grafting will possible fail to proceed.

As respects the procedure of the reaction, it suffices to place carbon black, the polymer, and the liquid dispersion medium mentioned above in a reaction apparatus and then mix and heat them together in the apparatus.

As the reaction apparatus, the same as mentioned in the first embodiment above can be used, and particularly, as mentioned above, the preferable is an apparatus for wet dispersion which comprises a vessel for holding therein a liquid to be treated, a stirrer adapted to rotate in the vessel, a heating device for heating the liquid held in the vessel, and a plurality of granular media held inside the vessel.

The mixing ratio of carbon black and the block- or graft-copolymer having a reactive group mentioned above for the purpose of the grafting cannot be generally defined because it is affected by the kind of the polymer to be used and etc. Appropriately, the amount of the polymer is in the approximate range of 5–100 parts by weight, preferably 10–80 parts by weight, based on 100 parts by weight of the carbon black. If the amount of the polymer is less than 5 part by weight, it will possibly become difficult to improve sufficiently the surface properties of carbon black. Conversely, if the amount exceeds 100 parts by weight, the amount of the polymer bound to carbon black will not increase beyond a certain level, while the amount of the polymer unreacted with the carbon black in the reaction system becomes duly large. Thus it will impair the economy of the production and further will possibly degrade the properties properly expected of the graft carbon black since the removal of the unreacted polymer from the product would be hardly difficult.

The production of the carbon black graft polymer according to this invention is not limited to using the method above mentioned. Other methods are also considerable for the production.

The graft- or block-copolymer can be also grafted to carbon black with high efficiency, when the molecular formulation of the copolymer is designed so that the segment (A) having the reactive group(s) capable of reacting the functional group on the surface of carbon black may acquire higher affinity for carbon black than the segment (B) manifesting high affinity for the target medium.

In this case, since the segment (A) of this polymer is oriented toward the carbon black side in the grafting system in the presence of a relatively optional dispersion medium (other than the liquid dispersion medium exhibiting extremely high affinity for the segment (A)) or even in the absence of the dispersion medium, the reactive group present in the segment (A) is effectively grafted by virtue of the surface of carbon black and a carbon black graft polymer having the same excellent properties is obtained in the same manner as the method described above.

In this method of production, the grafting of the polymer to carbon black is effected by stirring and mixing or melting and kneading these components in the presence of an arbitrary liquid dispersion medium, unless the dispersion medium manifests extremely high affinity for the segment (A) of the polymer.

The liquid dispersion medium which can be used in this grafting depends on the structure of the segment (A) of the relevant polymer. As the liquid dispersion medium, the same as mentioned in the first embodiment above can be used. The other conditions for the grafting treatment are the same as those for the method described above and the properties of the produced carbon black graft polymer are the same as those of the product of the method.

The carbon black graft polymer according to the present invention which is obtained as described above is preferred to have an average particle diameter in the range of 0.001–1 µm, particularly in the range of 0.01–0.5 µm.

Since the carbon black graft polymer according to this invention exhibits fine dispersibility in target media such as varying resins, rubbers, and solutions and has preferable properties such as high electric resistance property, despite the relative small weight of the grafted polymer component to the weight of the carbon clack component, namely the high carbon black content thereof, it would be preferably used for static charge image developing dry or liquid toners, ink-jet inks, inks, thermographic transfer inks, thermographic transfer ink ribbon coating agents, backcoating agents for magnetic recording media, black matrix, paint, materials requiring high resistance and imperviousness to light, artificial marble, coloring agents for plastic or rubber forming materials or light-impervious fibers, modifying agents or fillers for plastic such as polyolefin or polyester and rubber, lubricants, traction drive fluids, electroviscous fluids and nonlinear optical materials, electric resistance-adjusting agents such as antistatic materials, resisting materials in copying devices, planar heaters utilizing the PTC characteristics, and sealing agents for semiconductor device, for example, although not particularly limited.

Now, we will describe about the static charge image developing agent as one of typical usage of the carbon black graft polymer according to this invention.

The static charge image developing toner according to this invention contains as carbon black ingredients the carbon black graft polymer which comprises carbon black having specific surface area of not more than 70 $m^2/g$ and a polymer chain grafted thereto. The blending amount of the carbon black graft polymer would be preferably determined so as to satisfy that the carbon black content is in the range of 12–35% by weight, particularly 12–25% by weight on the basis of total toner weight. When the carbon black content is high as not less 12% by weight, it is possible to ensure the sufficient fixing image concentration even at the slight consumption of the toner, and thus possible to reduce the toner consumption and downsize the device. When exceeding 35% by weight, the different problem of the lowering of the image fixing would be arisen from the lowering of the binding resin component quantity, although the dispersiveness of the carbon black in the toner can be ensured.

In the toner of this invention, the components except for the above-mentioned carbon black graft polymer, namely binding resin, wax components, electric charges control agent, etc., are not particularly limited, and the components equal to those used in the toner known in this art would be usable.

As for the binder resin, for example, homopolymer of styrene and substitutes thereof such as polystyrene, poly p-styrene, polyvinyl toluene; styrenic copolymers such as styrene-p-chlorostyrene copolymer, styrene-propylene copolymer, styrene-vinyltoluene copolymer, styrene-methyl acrylate copolymer, styrene-ethyl acrylate copolymer, styrene-butyl acrylate copolymer, styrene-methyl methacrylate copolymer, styrene-ethyl methacrylate copolymer, styrene-butyl methacrylate copolymer, styrene-α-chloromethyl methacrylate copolymer, styrene-acrylonitrile copolymer, styrene-vinyl methylether copolymer, styrene-vinyl methyl ketone copolymer, styrene-butadiene copolymer, styrene-isoprene copolymer, styrene-maleic acid copolymer, styrene-maleate copolymer; polymethyl methacrylate, poly butyl methacrylate, polyvinyl chloride, polyvinyl acetate, polyethylene, polypropylene, polyester, polyurethane, polyamides, epoxy resin, polyvinylbutyral, polyacrylic acid resin, rosin, denatuered rosin, terpene resin, phenolicses, aliphatic or aliphatic hydrocarbon resin, aromatic petroleum resin, chlorinated paraffin, paraffin wax, etc. may be used in singly or combination of two or more compounds.

As the toner, that which obtained by the crushing method which comprises blending the carbon black graft polymer and other additives to such binder resin, fusing and kneading the blended material, then crushing and classifying the kneaded material can be used. Further, it is also usable for the toner of this invention, that which obtained by the suspension polymerization method where the carbon black graft polymer and other additives were blended to the polymerizable monomer when the monomer is suspension polymerized, or those obtained by other method such as the seed polymerization method, the emulsion polymerization method, the spray-dry method, the microcapsulating method, and etc.

The polymerizable monomer to be used in the process for producing binder resin component by the suspension polymerization imposes no restriction particularly. As concrete examples of the polymerizable monomer which is effective used herein, styrene type monomers such as styrene, o-methyl styrene, m-methyl styrene, p-methyl styrene, a-methyl styrene, p-methoxy styrene, p-tert-butyl styrene, p-phenyl styrene, o-chlorostyrene, m-chlorostyrene, p-chlorostyrene, acrylic or methacrylic type monomers such as methyl acrylate, ethyl acrylate, n-butyl acrylate, isobutyl acrylate, dodecyl acrylate, stearyl acrylate, 2-ethylhexyl acrylate, tetrahydrofurfuryl acrylate, methyl methacrylate, ethyl methacrylate, propyl methacrylate, n-butyl methacrylate, isobutyl methacrylate, n-octyl methacrylate, dodecyl methacrylate, 2-ethylhexyl methacrylate, and stearyl methacrylate; olefin type monomers such as ethylene, propylene and butylene; and other vinyl type monomers such as acrylic acid, methacrylic acid, vinyl chloride, vinyl acetate, acrylonitrile, acrylamide, methacylamide and N-pyrrolidone maybe cited. These polymerizable monomers may be used either singly or in the form of a mixture of two or more members. It is particularly preferably to use a styrene type monomer, an acrylic acid or methacrylic acid type monomer, or a combination thereof among other polymerizable monomers mentioned above.

It is possible to add other polymer such as polyester into the polymerizable monomer component. Further, known any additives such as chain transfer agent may be added to the polymerizable monomer. On the suspension polymerization, cross-linking agent can be also added thereto.

As concrete examples of the cross-linking agent, for example, aromatic divinyl compounds such as divinyl benzene, divinyl naphthalene, and derivatives thereof; diethylenic unsaturated carboxylic esters such as ethylene glycol dimethacrylate, diethylene glycol dimethacrylate, triethylene glycol dimethacrylate, trimethylol propane trimethacrylate, allyl methacrylate, t-butyl aminoethyl methacrylate, tetraethylene glycol dimethacrylate, 1,3-butylene dimethacrylate; and all divinyl compounds and compound having three or more vinyl groups such as N,N-divinyl aniline, divinyl ether, divinyl sulfide, and divinyl sulfonic acid, polybutadiene may be cited, but limited thereto.

Further, polybutadiene, polyisoprene, unsaturated polyester, chlorosulfonated polyolefin are also effective.

In the suspension polymerization, the dispersing stabilizer may be added to the reaction system in order to stabilize the suspended particles in the suspension medium. As the concrete examples of the suspension stabilizer, water soluble macromolecular such as polyvinyl alcohol, gelatine, gum dragon, starch, methyl cellulose, carboxymethylcellulose, hydroxyethyl cellulose, sodium polyacrylate, and sodium polymethacrylate; surfactants such as sodium dodecylbenzenesulfonate, sodium tetradecyl sulfate, sodium pentadecysulfate, sodium octylsulfate, allyl-alkyl-polyethersulfone acid sodium, sodium oleate, sodium laurate, sodium caprate, sodium caprylate, sodium caproate, potassium stearate, calcium oleate, 3,3'-disulphone diphenylurea-4,4'-diazo-bis-amino-8-naphthol-6-sodium sulphonate; o-carboxy benzene-azo-dimethylaniline, 2,2',5, 5'-tetramethyl-triphenylmethane-1,1'-diazo-bis-β-naphthol-disulfonic acid sodium; and others such as. alginate, seine, casein, barium sulfate, calcium sulfate, barium carbonate, magnesium carbonate, calcium phosphate, talc, clay, diatomaceous earth, bentonite, titanium hydroxide, hydroxide thorium, metal oxide powder, etc. may be cited, but not limited thereto.

The suspension stabilizer as disclosed above should be used as regulating properly its composition and amount so as to obtain the binder resin particles produced with a prescribed size, for example, 2–20 μm, more preferably, 3.5–15 μm. When using the water soluble macromolecule, it is preferable to use with an amount of 0.01–20% by weight, particularly, 0.1–10% by weight besed on the polymerizable monomer component. When using the surfactant, it is preferable to use with an amount of 0.01–10% by weight, particularly, 0.1–5% by weight besed on the polymerizable monomer component.

As the initiator for the polymerization under discussion, an oil-soluble peroxide type or azo type initiator which is in popular use for suspension polymerization can be used. As concrete examples of the polymerization initiator, such peroxide type initiators as benzoyl peroxide, lauroyl peroxide, octanoyl peroxide, benzoyl orthochloroperoxide, benzoyl orthomethoxy peroxide, methylethyl ketone peroxide, diisopropyl peroxy dicarbonate, cumene hydroperoxide, cyclohexanone peroxide, t-butyl hydroperoxide, and diisopropyl benzene hydroperoxide, and 2,2'-azobis-isobutyronitrile, 2,2'-azobis (2,4-dimethyl valero nitrile), 2,2'-azobis (2,3-dimethyl butyronitrile), 2,2'-azobis (2-methyl butyronitrile), 2,2'-azobis (2,3,3-trimethyl butyronitrile), 2,2'-azobis (2-isopropyl butyronitrile), 1,1'-azobis (cyclhexane-1-carbonitrile), 2,2'-azobis (4-methoxy-2,4-dimethyl valeronitrile), 2-(carbamoylazo) isobutyronitrile, 4,4'-azobis (4-cyanovaleric acid), and dimethyl-2,2'-azobis isobutyrate may be cited. The polymerization initiator is appropriately used in an amount in the range of 0.01–20% by weight, preferably 0.1–10% by weight.

The process for producing the toner according to this invention comprises preparing a polymerizable monomer composition combining a polymerizable monomer of the quality described above and the carbon black graft polymer with various other components, adding this composition to to an aqueous medium, then stirring the resultant mixture thereby forming liquid drops (particles of the polymerizable monomer composition) of a particle diameter aimed at, and subjecting the reaction mixture to suspension polymerization. This suspension polymerization is advantageously carried out either after the particle diameter of the liquid drops has been regulated or while the regulation of the particle diameter is in process, preferably after the regulation of the particle diameter has been performed. The regulation of the particle diameter is effected, for example, by stirring with the T. K. Homomixer the suspension having prescribed component dispersed in an aqueous medium. It is otherwise effected by passing the suspension at least once through a high-speed stirring machine like a line mixer (such as, for example, Ebara Milder). Thus, the liquid drops mentioned above have the particle diameter regulated to a prescribed size falling in the approximate range of 0.1–500 μm, preferably 0.5–100 μm, and more preferably 0.5–50 μm. After the polymerization, the toner particles are obtained by filtrating the resultant black particle out, and then washing and drying the filtrated particles. optionally, a step of removing the suspension dispersant, a step of flocculating the polymerized particles suspended in suspension medium, and a step of disintegrating the flocculating particles, would be inserted in the middle of the production process.

With respect to the carbon black graft polymer according to this invention, it is remarkable thing that even when the blending ratio of carbon black into the polymerizing composition is relatively heightened, such a situation is hardly occurred that the suspension polymerization is led into impossible due to the extreme increment in the velocity of the polymerizable monomer composition. Since the carbon black graft polymer of this invention shows good dispersibility even in a high blending ratio, and has relatively small polymer moiety.

As the magnetic powder which is used to obtain a magnetic toner, for example, powders of ferromagnetic metals such as iron, cobalt, and nickel, and powders of metal compounds such as magnetite, hematite, ferrite, etc. may be cited.

As the offset preventing agent which may be optionally added by necessitating in the static charge developing toner of this invention, is not particularly limited. The polymer having a softening point, measured by ring and ball method, being in the range of 80–180° C., for example, polyolefine having a weight average molecular weight of 1000–45000, particular, of 2000–6000, namely, what is called polyolefine wax can be suitably used. In addition, natural or synthesis paraffin wax, particularly, high-melting point paraffin wax of 60–70° C.; aliphatic acid metalic salts such as zinc salt, barium salt, lead salt, cobalt salt, calcium salt and magnesium salt of stearic acid, zinc salt, manganese salt, iron salt, lead salt of olefinic acid, zinc salt, cobalt salt, magnesium salt of palmitic acid, particularly salts of higher fatty acids having not less than 17 carbon atoms, similarly, higher alchohols such as myricyl alcohol, polyvalent alcohol esters such as stearic acid glyceride, palmitic acid glyceride, fatty acid esters such as myricyl stearate, myricyl palmitate; partially saponified aliphatic acid esters such as partially saponified montanoic acid ester; higher alipatic acids such as stearic acid, palmitic acid, montanoic acid; and aliphatic acid amides such as etylenebis stearoyl amide; and the mixtures thereof may be cited.

It is also possible to use crystalline (meth) acrylic ester type polymer as described in JP-A-06-148936, JP-A-06-194874 and JP-A-06-194877 as an offset preventing agent. When using the crystalline (meth) acrylic ester type polymer, it would be expected to be further improvement in characteristics such as anti-offset, mold releasing, fluidity, and charge build-up.

As charge controling agent, for example, nigrosine, monoazo dyes, zinc, hexadecyl succinate, alkyl ester or alkyl amid of naphtoic acid, nitrohumic acid, N,N-tetramethyl benzidine, tryazine, salicylic acid metal complex, etc. maybe cited. Such charge controling agent of doing the external addition, is more desirable than that of adding to the toner inwardly.

For example, inorganic fine particles such as colloidal silica, hydrophobic silica, hydrophobic titania, hydrophobic zirconia, the talc; and organic fine particles such as polystyrene beads, (meth)acrylic resin bead, etc. can be used as a superplasticizer.

The static charge developing toner obtained as described above has an average particle diameter in the approximate range of 2–20 μm, preferably 3.5–15 μm and the individual toner particles have carbon black incorporated herein as carbon black graft polymer dispersed homogeneously therein.

EXAMPLES

Now the present invention will be described in detail below with reference to working examples. This invention is not restricted by these working examples. The "parts" and "%" used in the following examples and controls are invariably those by weight unless specified otherwise.

Synthesis Example 1
: Synthesis of Treated Polymer

In 150 parts of toluene, 75 parts of polystyrene-macromer (made by Toa Gosei K.K. and sold under the product code of "AS-6,"), 15 parts of styrene, 10 parts of isopropylene oxazoline, and 3 parts of azoisobutyronitrile (AIBN) as an initiator were dissolved. The resultant composition was placed in a separable flask provided with a stirrer, a condenser, an $N_2$ introducing pipe, and a thermometer, left polymerizing in a current of $N_2$ at 80° C. for four hours, and further at 100° C. for two hours, and cooled. After the cooling, the reaction product was removed. This reaction product was deprived of the toluene solvent by treatment with an evaporator and a reduced pressure drier to afford a treated polymer (1).

Synthesis Example 2
: Graft polymerization to Carbon Black

In a separable flask provided with a stirrer, a condenser, and a thermometer, 6 parts of the treated polymer (1), 20 parts of carbon black (pH 3.1, specific surface area 40 $m^2/g$, DBP oil absorption 46 ml/100 g), 59.2 parts of styrene, and 14.8 parts of n-butyl acrylate were placed and wetted. The wet mixture and 600 parts of zirconia beads thrown therein were stirred together at 600 rpm, left undergoing a grafting reaction at 100° C. for three hours, and deprived of beads to afford a coloring agent-containing monomer composition (1) having a carbon black content of 20%.

When the ratio of the amount of carbon black/amount of the grafted polymer in the carbon black graft polymer present in the coloring agent-containing monomer composition (1) was examined as followed, it was found to be about 10/1.

Synthesis Example 3
: Synthesis of Treated Polymer

In a separable flask provided with a stirrer, a condenser, an $N_2$ inlet tube, and a thermometer, 400 parts of deionized water containing 0.2 part of vinyl alcohol was placed. To the contents of the flask, a mixture prepared in advance by dissolving 16 parts of benzoyl peroxide as a polymerization initiator in a polymerizing monomer composition consisting of 160 parts of styrene, 30 parts of n-butyl acrylate, and 10 parts of glycidyl methacrylate was added. They were stirred together at a high speed to form a homogeneous suspension. Then, the suspension was heated to 80° C. together with $N_2$ blown meanwhile therein, stirred continuously at this temperature for five hours to induce a reaction of polymerization, and subsequently cooled to afford a polymer suspension. This polymer suspension was filtered to separate the polymer and the polymer was washed and then dried to afford a treated polymer (2) containing an epoxy group as a reactive group.

Synthesis Example 4
: Graft Polymerization to Carbon Black

By the use of a Labo Plast mill (made by Toyo Seiki K.K.), 20 parts of the treated polymer (2) mentioned above and 16 parts of carbon black (pH 3.1, specific surface area of 40 $m^2/g$, and DBP oil absorption of 46 ml/100 g) were kneaded together under the condition of 160° C. and 100 rpm. The resultant blend was cooled and pulverized to afford a carbon black graft polymer (2) having a carbon black content of 55.56%.

When the ratio of the amount of carbon black/amount of the grafted polymer in the carbon black graft polymer was examined as followed, it was found to be about 10/1.

Synthesis Example 5
: Graft Polymerization to Carbon Black

A coloring agent-containing monomer composition (4) having a carbon black content of 20% was obtained by following the procedure of Example of Synthesis 2 while using carbon black (pH 15 3.0, specific surface area of 120 $m^2/g$, DBP oil absorption of 58 ml/100 g) i[008e] th[0085] plac[0085] of th[0085] carbo[008e] black (pH 3.1, specific surface area of 40 $m^2/g$, and DBP oil absorption of 58 ml/100 g).

When the ratio of the amount of carbon black/amount of the grafted polymer in the carbon black graft polymer present in the coloring agent-containing monomer composition (4) was examined as followed, it was found to be about 10/1.

Example 1
: Synthesis of Colored Spherical Fine Particles

In 100 parts of the monomer composition (1) mentioned above, 4 parts of AIBN was added as an initiator and dissolved therein. In the same separable flask as used in Example of Synthesis 1, one part of an anionic surfactant (produced by Daiichi Kogyo K.K. and sold under the trademark designation of "Hitenol N-08") and 897 parts of deionized water were placed and the initiator-containing monomer composition (1) prepared as described above was added thereto and they were stirred together at 8000 rpm for five minutes with a mixer (sold by Tokusho Kika Kogyo K.K. and sold under the trademark designation of "T. K. Homomixer) to form a homogeneous suspension. Then, the suspension was suspension polymerized as blowing $N_2$ at 60° C. for four hours and further at 75° C. for two hours to afford a suspension of colored spherical fine particles having an average particle diameter of 4 μm. The suspension was subjected to solid-liquid separation and dried at 50° C. for 24 hours to afford colored fine particles (1).

For the purpose of testing the colored fine particles (1) for the state of dispersion of carbon black, the colored fine particles were solidified with an embedding resin and a thin slice was cut from the resultant solid mass with a microtome and observed under a transmission electron microscope. It was confirmed that the carbon black was uniformly dispersed finely in the colored minute particles.

Example 2
: Synthesis of Colored Spherical Fine Particles

A polymerizing monomer composition (2) was obtained by mixing 54 parts of the carbon black graft polymer (2) mentioned above (carbon black 30 parts), 36.8 parts of styrene, 9.2 parts of n-butyl acrylate, and 4 parts of AIBN as an initiator and melting and dispersing the resultant mixture.

In the same flask as used in Synthesis Example 1, 1 part of an anionic surfactant (produced by Daiichi Kogyo K.K. and sold under the trademark designation of "Hitenol N-08"), and 897 parts of deionized water were placed and the monomer composition (2) prepared in advance as described above was added thereto and they were stirred together at 8000 rpm for five minutes with a mixer (sold by Tokusho Kika Kogyo K.K. and sold under the trademark designation of "T. K. Homomixer) to form a homogeneous suspension. Then, the suspension was suspension polymerized as blowing with $N_2$ at 60C for four hours and further at 75° C. for two hours to afford a suspension of colored spherical fine particles having an average particle diameter of 5 μm. The suspension was subjected to solid-liquid separation and dried at 50° C. for 24 hours to afford colored fine particles (2) having the carbon black content of 30%.

For the purpose of testing the colored fine particles (2) for the state of dispersion of carbon black, the colored fine particles were solidified with an embedding resin and a thin slice was cut from the resultant solid mass with a microtome and observed under a transmission electron microscope. It was confirmed that the carbon black was uniformly dispersed finely in the colored minute particles.

Example 3

Colored fine particles (3) having a carbon black content of 20% were obtained by following the procedure of Example 2 while changing the amount of the carbon black graft polymer (2) to 36 parts (carbon black 20 parts) that of styrene to 50.56 parts, and that of n-butyl acrylate to 13.44 parts.

For the purpose of testing the colored fine particles (3) for the state of dispersion of carbon black, the colored fine particles were solidified with an embedding resin and a thin slice was cut from the resultant solid mass with a microtome and observed under a transmission electron microscope. It was confirmed that the carbon black was uniformly dispersed finely in the colored minute particles.

Example 4

When the procedure of Example 1 was faithfully repeated, excepting a monomer composition (4) was used in the place of the monomer composition (1), the process advanced without any inconvenience to afford colored fine particles (4) having a carbon content of 20%.

For the purpose of testing the colored fine particles (4) for the state of dispersion of carbon black, the colored fine particles were solidified with an embedding resin and a thin slice was cut from the resultant solid mass with a microtome and observed under a transmission electron microscope. It was confirmed that the carbon black was uniformly dispersed finely in the colored minute particles.

Examples 5–8

The colored fine particles (1)–(4) obtained as described above and 0.3% of hydrophobic silica (produced by Nippon Aerosil K.K. and sold under the trademark designation of "Aerosil R-792") added respectively thereto were thoroughly mixed. The resultant mixtures were respectively formulated and mixed to a toner concentration of 2% by the use of a resin coat ferrite carrier to manufacture two-component developers. These developers were set in a copying machine obtained by partially remodeling a copier (made by Toshiba K.K. and sold under the trademark designation of "Leodry 7610") and subjected to a copying test. They invariably produced fine images having excellent photographic density and showing no sign of fogging.

Control Synthesis 1

An operation for graft polymerization of carbon black was carried out by following the procedure of Example of Synthesis 4 while using carbon black (pH 3.5, specific surface area of 134 $m^2/g$, and a DBP oil absorption of 100 ml/100 g) in the place of the carbon black (pH 3.1, a specific surface area of 40 $m^2/g$, and a DBP oil absorption of 46 ml/100. In this operation, the carbon black generated vigorous friction, the kneading temperature could not be controlled, the resin in the process was deteriorated with emission of the offensive odor of scorching, and the reaction could not be continued any longer.

Control Synthesis 2

An effort to perform an operation by following the procedure of Example of Synthesis 2 while using carbon black (pH 3.0, a specific surface area of 200 $m^2/g$, and a DBP oil absorption of 55 ml/100 g) in the place of the carbon black (pH 3.1, a specific surface area of 40 $m^2/g$, and a DBP oil absorption of 46 ml/100 g) failed to obtain a monomer composition having a carbon black content of 20% because the stirring at 600 rpm caused the mixture under treatment to assume a puffy constitution.

Control 1

In a glass vial (commonly used for mayonnaise), 20 parts of the same carbon black (pH 3.1, a specific surface area of 40 $m^2/g$, and a DBP oil absorption of 46 ml/100 part) as used in Example of Synthesis 1, 10 parts of a phenol-terpene copolymer, 56 parts of styrene, 14 parts of n-butyl acrylate, 4 parts of AIBN, and 2 parts of 2,2'-azoisodimethyl valeronitrile were placed in conjunction with 130 parts of glass beads, 1 mm in diameter, and they were subjected to a dispersing treatment for four hours by the use of a paint shaker (made by Toyo Seiki K.K.). The mixture under treatment showed a sign of serious increase of viscosity.

The mixed mass, a monomer composition for comparison (1), as extracted forcibly from the glass vial. When the same procedure of Example 1 was performed on this mixed mass in the place of the monomer composition (1), the mass in the process of polymerization developed a phenomenon of aggregating and discharging carbon black. Thus, no stable suspension could not be obtained.

Synthesis Example 6:
Synthesis of Treated Polymer

In 100 parts of ethanol, 75 parts of ethylene glycol macromer (made by Kyoeisha Yushi K.K. and sold under the product code of "041MA"), 15 parts of styrene, 15 parts of isopropenyl oxazoline, and 5 parts of 2,2'-azobis(2,4-dimethyl valeronitrile) were dissolved. In a separable flask provided with a stirrer, a condenser, an $N_2$ inlet tube, and a thermometer, the composition obtained as described above was placed and polymerized as blowing $N_2$ at 70° C. for five hours and further at 80° C. for 10 hours. The reaction product was cooled and extracted from the separable flask. It was then deprived of the ethanol by the use of an evaporator and a reduced pressure drier to afford a treated polymer (A).

Example 9

A rubber sheet was obtained by kneading 15 parts of the treated polymer (1) mentioned above, 100 parts of carbon black (pH 3.1, a specific surface area of 40 $m^2/g$, and a DBP oil absorption of 46 ml/100 g), and 65 parts of NBR in a laboratory blast mill at 100° C. for one hour enough to induce a reaction. The produced rubber composition was passed between two rolls to afford a rubber sheet. When the rubber sheet was examined visually, the surface thereof was flat, smooth, and glossy.

Control 2

A rubber sheet was obtained by following the procedure of Example 9 while using carbon black (pH 3.4, a specific surface area of 150 $m^2/g$, and a DBP oil absorption of 50 ml/100 g) in the place of the carbon black of Example 9. When the rubber sheet was examined visually, the surface thereof was found to have a coarse texture and show no gloss.

Example 10

A polymer solution was prepared by combining 75 parts of polyethyl methacrylate macromer (produced by Toa Gosei K.K. and sold under the product code of "AA-6"), 15 parts of styrene, 10 parts of isopropylene oxazoline, 3 parts of azoisobutyronitrile (AIBN) as an initiator, and 100 parts of propylene glycol monoethylether acetate as a solvent.

Wet grafting was attempted by combining 100 parts of carbon black (pH 3.1, a specific surface area of 63 $m^2/g$, and a DBP oil absorption of 52 ml/100 g) and 40 parts of the polymer solution mentioned above. They were stirred under the conditions of 100° C. and three hours.

The reaction solution consequently obtained showed viscosity of 20 cp.

Control 3

The wet grafting was carried out by following the procedure of Example 10 while using carbon black (pH 3, a specific surface area of 130 $m^2$, and a DBP oil absorption of 54 ml/100 g) in the place of the carbon black of Example 10. The reaction solution consequently obtained showed viscosity of not less than 500 cp.

The various numeral values of property described in this specification were obtained by the following methods of determination.

Specific Surface Area

This is the nitrogen adsorption specific surface area determined in accordance with the BET method specified in ASTM.

DBP Oil Absorption

This attribute is determined by placing 20 g of a sample dried in advance at 150° C.±1° C. for one hour in the mixing chamber of an instrument (having spring tension 2.68 kg/cm, made by Brabender Corp. and sold under the trademark designation of "Absorptmeter"), setting into motion the rotary machine of the mixing chamber whose limit switch has been set in advance at a position of about 70% of the maximum torque, at the same time starting the addition of DBP from an automatic buret at a fixed rate, finding the amount of the DBP added until the limit switch is turned off in consequence of the abrupt increase of torque near the end point, and calculating the DBP oil absorption in accordance with the following formula.

DBP absorption (ml/100 g)={Amount of DBP added (ml)/(About of sample (20 g)}×100

Ratio of Amount of Carbon Black/amount of Grafted Polymer (a) Process of centrifugation
  Machine used: Hitachi CP 60E
  Rotor used: P50A2T
  Tube used: 40PA tube, 35 ml The master solution of carbon black graft polymer after the grafting treatment is diluted with methyl isobutyl ketone to 10 times the original volume. About 27 g of the diluted solution is placed in the tube and subjected to centrifugation (40000 rpm, 30 minutes). Then, the supernatant (polymer which has escaped the grafting) and the sediment (graft carbon black are quickly separated by decantation. The sediment thus separated is dried at room temperature for 24 hours.

(b) Process of thermal balance
  Apparatus used: Shimadzu TGA-50H
  Conditions of temperature increase: The sample is heated from room temperature to 600° C. (at a temperature increasing rate of 20° C./minute), kept at 600° C. for 10 minutes and, with the atmosphere switched from nitrogen to air 3 minutes after the arrival of temperature at 600° C., and heated in the atmosphere of air from 600° C. to 1000° C. (at a temperature increasing rate of 20° C./minute)

About 20 mg of the dried sample is placed in a platinum cell and set undergoing the determination. At first, the polymer component is thermally decomposed in the atmosphere of nitrogen and then the carbon black is burned in the atmosphere of air. The gravimetric ratio of the amount of carbon black/amount of grafted polymer is calculated on the assumption that the weight loss in the atmosphere of nitrogen has originated from the polymer and the weight loss in the atmosphere of air from the carbon black respectively.

The entire disclosures of Japanese Patent Application Nos. 10-259,642 and 11-255,916 filed on Sep. 14, 1998, and Sep. 9, 1999, respectively including their specifications, claims, drawings, and summaries are incorporated herein by reference in their entirety.

What is claimed is:

1. Carbon black graft polymer which comprises carbon black and a polymer chain grafted thereto, wherein said carbon black has a specific surface area of 30 to 70 $m^2/g$ and a dibutyl phthalate oil absorption capacity of 10 to 70 ml/100 g.

2. Carbon black graft polymer according to claim 1, wherein said carbon black graft polymer is obtained by subjecting 100 parts by weight of carbon black having a relative surface area of 30 to 70 $m^2/g$ and a dibutyl phthalate oil absorption capacity of 10 to 70 ml/100 g and 5–100 parts by weight of a polymer having a reactive group exhibiting reactivity to the functional group on the surface of the carbon black to a thermal reaction.

3. Carbon black graft polymer according to claim 2, wherein said thermal reaction is carried out by melting said polymer and kneading it with said carbon black.

4. Carbon black graft polymer according to claim 2, wherein said thermal reaction is carried out by heating and stirring said carbon black and said polymer in the presence of a liquid dispersing medium.

5. Carbon black graft polymer according to claim 1, wherein said carbon black graft polymer is obtained by heating and stirring 100 parts by weight of carbon black having a specific surface area of 30 to 70 $m^2/g$ and having a dibutyl phthalate oil absorption capacity of 10 to 70 ml/100 g with 5–100 parts by weight of a block or graft type polymer formed of a segment (A) containing a reactive group having reactivity with the functional group on the surface of said carbon black and an another segment (B) differing in structure from the segment (A) mentioned above in the presence of a liquid dispersing medium.

6. Hyperdispersoid of carbon black which comprises a matrix selected from the group consisting of resin, rubber, and solvent, and a carbon black graft polymer being dispersed in said matrix, wherein said carbon black graft polymer comprises a carbon black having a specific surface area of 30 to 70 $m^2/g$ and having a dibutyl phathalate oil absorption capacity of 10 to 70 ml/100 g and a polymer chain grafted thereto.

7. Static charge developing toner which comprises a binding resin and a carbon black graft polymer, wherein said carbon black graft polymer comprises a carbon black having a specific surface area of 30 to 70 $m^2/g$ and having a dibutyl phathalate oil absorption capacity of 10 to 70 ml/100 g and a polymer chain grafted thereto.

8. Static charge developing toner according to claim 7, wherein the content of said carbon black is to be in the range of 12–35 wt. % based on the total weight of the toner.

9. Carbon black graft polymer according to claim 1, wherein said carbon black has a pH value of 1–5.

10. Hiperdispersoid according to claim 6, wherein said carbon black has a pH value of 1–5.

11. Toner according to claim 7, wherein said carbon black has a pH value of 1–5.

* * * * *